3,499,842
METAL SEQUESTRANT
Ronald H. Carlson, Lewiston, N.Y., assignor to Hooker Chemical Corporation, Niagara Falls, N.Y., a corporation of New York
No Drawing. Continuation-in-part of application Ser. No. 597,542, Nov. 29, 1966. This application Nov. 2, 1967, Ser. No. 680,022
The portion of the term of the patent subsequent to Nov. 11, 1986, has been disclaimed
Int. Cl. C02b 5/00
U.S. Cl. 252—180                    6 Claims

ABSTRACT OF THE DISCLOSURE

A method of sequestering at least one metal ion from solution which comprises introducing into the solution a water-soluble compound of the formula:

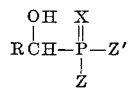

wherein X is a member selected from the group consisting of sulfur and oxygen; R is a member selected from the group consisting of —H and alkyl of 1 to 2 carbon atoms; Z and Z' are each a member selected from the group consisting of alkyl of 1 to 3 carbon atoms, hydroxy alkyl of 1 to 3 carbon atoms and —OH, providing that both Z and Z' are not simultaneously —CH$_2$OH.

This application is a continuation-in-part of Ser. No. 597,542 filed Nov. 29, 1966.

This invention relates to a novel method for sequestering metal ions.

The use of complexing agents which combine with metal ions in solution to form soluble complexes (which agents are commonly referred to as sequestrants) is of great importance in many industrial processes inasmuch as it may prevent undesired precipitation reactions from occurring. Not all sequestrants, however, are equally effective, their activity varying with their structures and the conditions under which they are used; for example, the common carboxylic acid sequestrants are often ineffective in preventing ferric ion precipitation from alkaline solutions of pH greater than 8.

It is an object of this invention to provide a method for sequestering metal ions. It is a further object of this invention to provide a particularly effective method for complexing ferric ions in alkaline solutions.

In accordance with this invention, a method of sequestering at least one metal ion from an aqueous or water/lower alcohol (methanol, or ethanol, or propanol) solution at any convenient pH, preferably of about pH 10.5 or more, comprises adding a water-soluble first member selected from the group consisting of tris(hydroxyalkyl) phosphine such as tris(hydroxymethyl) phosphine or tris(hydroxypropyl) phosphine, tetrakis(hydroxyalkyl) phosphonium halide such as preferably tetrakis(hydroxymethyl) phosphonium chloride or tetrakis(hydroxyethyl) phosphonium bromide, tetrakis(hydroxyalkyl) phosphonium hydroxide such as tetrakis(hydroxymethyl or hydroxyethyl) phosphonium hydroxide, tetrakis(hydroxyalkyl) phosphonium organic salt such as tetrakis(hydroxymethyl or hydroxypropyl) phosphonium acetate and a preferred compound of the Formula I:

wherein X is a sulfur or preferably an oxygen atom, wherein R is a alkanol group of from 1 to 3 carbon atoms, preferably 1 to 2 carbons, and Z and Z$^1$ are independently selected from the group consisting of hydroxy, alkyl groups of from 1 to 3 carbon atoms, and alkanol groups of 1 to 3 carbons, preferably 1 to 2 carbons, provided that at least one of R, Z and Z$^1$ is a primary alkanol at least when both of Z and Z$^1$ are alkanol, to a solution in which said metal ion is present.

The compounds of the Formula I are also effective stabilizers of hydrogen peroxide against catalytic degradation caused by the presence of metal cation contaminants. When employed for peroxide stabilization, the stabilizer of Formula I may be added either to the peroxide (such as hydrogen peroxide or to a precursor of the peroxide.

The use of the following compounds as sequestrants or as hydrogen peroxide stabilizers is, for example, within the scope of this invention:

bis(hydroxymethyl)methylphosphine oxide;
bis(hydroxymethyl) phosphinic acid;
bis(hydroxymethyl)3-hydroxypropylphosphine oxide;
bis(hydroxymethyl) 1-hydroxypropylphosphine oxide;
bis(hydroxymethyl) 2-hydroxypropylphosphine oxide;
bis(hydroxymethyl)propylphosphine oxide;
bis(hydroxymethyl)2-hydroxyethylphosphine oxide;
bis(hydroxymethyl) 1-hydroxyethylphosphine oxide;
bis(2-hydroxyethyl) hydroxymethylphosphine oxide;
bis-(1-hydroxyethyl) hydroxymethylphosphine oxide;
hydroxymethyl-2-hydroxyethylphosphinic acid;
hydroxymethyl-1-hydroxyethyl phosphinic acid;
hydroxymethyl-2-hydroxyethylethylphosphine oxide;
hydroxymethyl-1-hydroxyethylethylphosphine oxide;
bis(3-hydroxypropyl)hydroxymethylphosphine oxide;
bis(1-hydroxypropyl)hydroxymethylphosphine oxide;
bis(2-hydroxypropyl)hydroxymethylphosphine oxide;
hydroxymethyl-3-hydroxypropylethylphosphine oxide;
hydroxymethyl-1-hydroxypropylethylphosphine oxide;
hydroxymethyl-2-hydroxypropylethylphosphine oxide;
bis(2-hydroxyethyl)phosphinic acid;
bis(2-hydroxyethyl)-3-hydroxypropylphosphine oxide;
bis(2-hydroxyethyl)ethylphosphine oxide;
bis(2-hydroxyethyl)methylphosphine oxide;
tris(hydroxymethyl)phosphine oxide;
2-hydroxyethylmethylpropylphosphine oxide;
2-hydroxyethylmethylphosphinic acid;
bis(2-hydroxyethyl)propylphosphine oxide;
bis(propyl)2-hydroxyethylphosphine oxide;
2-hydroxyethylmethyl-3-hydroxypropylphosphine oxide;
2-hydroxyethylpropyl-3-hydroxypropylphosphine oxide;
3-hydroxypropylhydroxymethyl-2-hydroxyethyl phosphine oxide;
bis(2-hydroxyethyl)-2-hydroxypropylphosphine acid;
2-hydroxypropyl-2-hydroxyethylethylphosphine oxide;
2-hydroxypropyl-2-hydroxyethylpropylphosphine oxide;
hydroxymethylpropylphosphinic acid;
hydroxymethylmethyl-2-hydroxyethylphosphine oxide;
bis(methyl)hydroxymethylphosphine oxide;
hydroxymethylmethylethyl phosphine oxide;
bis(hydroxymethyl)ethylphosphine oxide;
hydroxymethylethylphosphinic acid;
bis(ethyl)hydroxymethylphosphine oxide;
hydroxymethylpropyl-3-hydroxypropylphosphine oxide;
hydroxymethylpropylphosphinic acid;
hydroxymethylethylmethylphosphine oxide;
bis(propyl)hydroxymethylphosphine oxide;
hydroxymethylpropyl-2-hydroxypropylphosphine oxide;
tris(2-hydroxyethyl)phosphine oxide;
tris(1-hydroxyethyl)phosphilne oxide;
bis(2-hydroxyethyl)-1-hydroxypropylphosphine oxide;
hydroxymethylphosphonic acid 1-hydroxyethylphosphonic acid;
2-hydroxyethylphosphonic acid;
1-hydroxypropylphosphonic acid;
2-hydroxypropylphosphonic acid;
and the like.

Except for the first-member compounds of Formula I, the compound of said first member—i.e., the trisalkanol phosphine compounds and the tetrakisalkanol phosphonium compounds—undergo oxidation in an aqueous solution of about pH 7 or more.

The rate of oxidation increases as pH increases upward from pH 7. The product of the oxidation of each of the tetrakis phosphonium compounds and the alkanol phosphine compounds is tris(hydroxyalkyl)phosphine oxide.

Each of the aforementioned compounds is effective in sequestering metal ions. It is preferred to use said compounds as sequestrants for the ions of metals of Groups III-A and IV-A of the Periodic Table, and for ions of the transition, rare earth and actinide metals. It is more preferred to use said compounds as sequestrants for the ions of the transition metals including Groups I-B and II-B of the Periodic Table, and it is most preferred to use said compounds as sequestrants for ferric ions.

Some of the typical metals whose ions may be sequestered by the compounds of this invention include, e.g., iron, aluminum, copper, nickel, chromium, tin, lead, gadolinium, europium, neodymium, uranium and the like.

The above compounds find many uses as sequestrants. They may, for example, be used in detergents, in metal cleaning baths, in dye solutions, in fertilizer formulations, to stabilize peroxide solutions and for other similar purposes.

In a preferred embodiment of this invention, those compounds in which Z and $Z^1$ are selected from the group consisting of hydroxy and alkanol of from 1 to 3 carbon atoms are employed. In a more preferred embodiment of the invention, those compounds in which Z and $Z^1$ are selected from the group consisting of hydroxy, —$CH_2OH$, and $C_2H_4OH$, and wherein R is an alkyl group of from 1 to 2 carbon atoms, are used as sequestrants. In the most preferred embodiment of the invention, the compounds

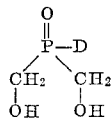

wherein D is selected from the group consisting of OH and $CH_2OH$ are used. For example, tris(hydroxymethyl) phosphine oxide, which is of the formula

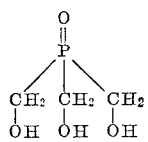

is an outstanding ferric ion sequestrant.

The aforementioned compounds may be used as sequestrants in solution wherein the pH is from 1–14, though they tend to be more effective in alkaline solutions. Accordingly, it is preferred to use these compounds as sequestrants for solutions whose pH's are from about 7 to about 14, and it is even more preferred to use said compounds as sequestrants for those solutions whose pH's are from about 10 to about 14.

Said compounds, when added to those solutions in which sequestration is desired, may be added as solids or solutions. It it is desired to add said compounds as solutions, the compounds may be dissolved in polar solvents such as water; mixture of water and lower alkanols of from 1 to 4 carbon atoms wherein up to about 50 percent of said mixtures is comprised of alkanol; and the like. From about 0.001 percent to about 25 percent concentration (by weight) may be used (percent concentration) (by weight)=weight of sequestrant×100. Weight of sequestrant+weight of solvent (if any) in which sequestrant is dissolved before being added to solution to be sequestered+weight of solution to be sequestered (prior to the time sequestrant is added); though it is preferred to use from about 0.01 to about 5 percent concentration (by weight), and it is even more preferred to use from about 0.1 to about 3 percent concentration (by weight).

It is preferred to use said compounds as sequestrants in aqueous solutions, such as water solutions; solutions containing mixtures of water and lower alkanols of 1 to about 4 carbon atoms wherein up to about 50 percent of said mixtures is comprised of alkanol; and the like. When said compounds are added to the solutions to be sequestered, the temperatures of said solutions may be from about 0 to about 100 degrees centigrade, though it is preferred that said temperatures be from about 20 to about 70 degrees centigrade, and it is even more preferred that said solutions be at ambient temperatures.

The following examples are illustrative of the invention, and are not to be deemed limitative thereof. Unless otherwise specified, parts are by weight and temperatures are in degrees centigrade.

EXAMPLE 1

0.4 part of ferric chloride dissolved in 5 parts of water were added to a solution of 0.25 part of sequestrant in 5 parts of water, and the pH of the resulting mixture was adjusted to 11. A slurry was obtained, and the slurry was then magnetically stirred for about 60 hours to cause the sequestrant to combine with as much of the ferric ions as it could hold. The slurry was then centrifuged, and the supernatant liquid was analyzed for ferric ion content by X-ray fluorescence technique. For every 100 parts of ethylenediaminetetraacetic acid sequestrant added, 5.68 parts of ferric ion were sequestered. This sequestering activity of ethylenediaminetetraacetic acid was assigned a value of 1.00, and the sequestering power values of the other sequestrants were calculated in relation to the activity of ethylenediaminetetraacetic acid (e.g., a complexing agent, 100 parts of which sequestered 11.36 parts of ferric ion, would have a sequestering activity of 2). The following results were obtained.

| Sequestering agent: | Sequestering activity [1] |
|---|---|
| Tris(hydroxymethyl) phosphine oxide | 6.08 |
| Gluconic acid | 4.50 |
| Ethylenediaminetetraacetic acid | 1.00 |
| Nitrilotriacetic acid | 0.06 |
| Nitrilotrimethylene phosphonic acid | 0.14 |

[1] Relative to an assigned sequestering activity of 1.00 for ethylenediaminetetraacetic acid, 100 parts of which sequestered 5.68 parts of ferric ion.

It is noteworthy that tris(hydroxymethyl) phosphine oxide is about 1.4 times as effective a sequestrant as gluconic acid, which latter compound is regarded by those skilled in the art as being a very efficient ferric ion sequestrant. Tris(hydroxymethyl) phosphine oxide is about 6 times as efficient as ethylenediaminetetraacetic acid in sequestering ferric ion, and is about 100 times as effective a ferric ion sequestrant as is nitrilotriacetic acid.

When compounds of the formula

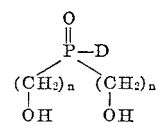

wherein $n$ is from 1 to 3 and D is selected from the group of $(CH_2)_nOH$, $CH_2OH$, and OH are used, it is found that they are effective sequestrants. Said compounds exhibit sequestering activity in both acid and alkaline solutions, but are especially effective in alkaline solutions wherein the metal ions to be sequestered are selected from the group consisting of ferric ion, cupric ion, nickel ion, chromium ion, and aluminum ion.

When the procedure of Example 1 is followed, with chromium chloride being used in place of ferric chloride, similar results are obtained, the chromium ion being complexed as was the ferric ion in Example 1.

EXAMPLE 2

Three parts of the sequestrant to be tested were dissolved in 27 parts of water, and the pH of the solution was adjusted to 10. Into this solution was titrated one molar ferric chloride aqueous solution, and this titration was continued until the first sign of cloudiness appeared in the solution (indicating that all of the sequestering activity of the sequestrant to be tested had been exhausted). During said titration of the pH of said solution was maintained at 10. The following results were obtained.

| Sequestrant tested: | Parts of ferric chloride [1] |
|---|---|
| Tris(hydroxymethyl)phosphine oxide | 4.1 |
| Tetrakis(hydroxymethyl)phosphonium chloride | 1.5 |
| Bis(hydroxymethyl)phosphinic acid | 0.4 |
| Bis(hydroxymethyl)methylphosphine oxide | 0.3 |

[1] Added to solution before cloudiness appeared.

Similar results are obtained when the three aforementioned compounds are used as sequestrants for other metal ions.

While the invention has been described with reference to certain specific embodiments, it will be recognized by those skilled in the art that many variations are possible without departing from the spirit and scope of the invention.

I claim:

1. A method of sequestering at least one metal ion in aqueous solution which comprises introducing into the solution a water soluble compound of the formula:

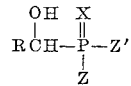

wherein X is a member selected from the group consisting of sulfur and oxygen; R is a member selected from the group consisting of —H and alkyl of 1 to 2 carbon atoms; Z and Z' are each a member selected from the group consisting of alkyl of 1 to 3 carbon atoms, hydroxy alkyl of 1 to 3 carbon atoms and —OH, providing that both Z and Z' are not simultaneously —CH$_2$OH.

2. The method of claim 1 in which an amount of said water soluble compound is introduced into said solution to provide a concentration between about 0.1 to about 5 percent by weight of the final solution.

3. The method of claim 1 in which said metal ion is selected from the group consisting of ferric and chromic ions.

4. The method of claim 1 in which the pH of said solution is between about 7 to 14.

5. The method of claim 1 in which X is oxygen.

6. The method of claim 5 in which said solution is an aqueous solution having a pH above about 7 and said water-soluble compound is formed in situ by oxidation of a member selected from the group consisting of a phosphine, phosphonium halide, phosphonium hydroxide and phosphonium salt of an organic acid, having substituents defined in the moieties

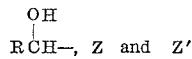

References Cited

UNITED STATES PATENTS

| 3,117,165 | 1/1964 | Epstein | 260—60.65 |
| 3,291,840 | 12/1966 | Buckler et al. | 260—60.65 |

OTHER REFERENCES

Blake et al.: Nuclear Science Abstracts, United States Atomic Energy Commission, Technical Information Service Extension, Oak Ridge, Tenn. vol. 11, No. 4, Supp., February, 1957, p. 254.

TOBIAS E. LEVON, Primary Examiner

A. P. DEMERS, Assistant Examiner

U.S. Cl. X.R.

252—175, 400; 260—438.5, 439